(12) United States Patent
Gao et al.

(10) Patent No.: US 11,777,612 B2
(45) Date of Patent: Oct. 3, 2023

(54) METHOD FOR NONLINEAR COMPENSATION OF COHERENT HIGH-CAPACITY HIGH-ORDER QAM SYSTEM

(71) Applicant: SOOCHOW UNIVERSITY, Suzhou (CN)

(72) Inventors: Mingyi Gao, Suzhou (CN); Lei Wang, Suzhou (CN); Gangxiang Shen, Suzhou (CN); Xiaodi You, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 11 days.

(21) Appl. No.: 17/764,075

(22) PCT Filed: Mar. 5, 2021

(86) PCT No.: PCT/CN2021/079325
§ 371 (c)(1),
(2) Date: Mar. 25, 2022

(87) PCT Pub. No.: WO2022/178918
PCT Pub. Date: Sep. 1, 2022

(65) Prior Publication Data
US 2023/0179307 A1    Jun. 8, 2023

(30) Foreign Application Priority Data
Feb. 23, 2021 (CN) .......................... 202110200958.5

(51) Int. Cl.
*H04B 10/61* (2013.01)
*H04L 27/38* (2006.01)

(52) U.S. Cl.
CPC ....... *H04B 10/6163* (2013.01); *H04B 10/616* (2013.01); *H04B 10/6161* (2013.01);
(Continued)

(58) Field of Classification Search
CPC ........ H04B 2210/25–256; H04B 10/615–6166
(Continued)

(56) References Cited

U.S. PATENT DOCUMENTS 9,002,210 B2 * 4/2015 Lowery .............. H04B 10/6971
398/141
10,938,483 B1 * 3/2021 Babaee .............. H04B 10/6971
(Continued)

FOREIGN PATENT DOCUMENTS

CN      105680946 A      6/2016
CN      107819513 A  *  3/2018  ......... H04B 10/2543
(Continued)

*Primary Examiner* — Li Liu
(74) *Attorney, Agent, or Firm* — SZDC LAW P.C.

(57) ABSTRACT

The invention provides a method for nonlinear compensation of coherent high-capacity high-order QAM system, including: deploying an OPC on an intermediate link of communication between a transmitter and receiver, and performing phase conjugation on a transmitted signal based on the OPC to generate idler; performing phase recovery on a compensated signal at the receiver to obtain a constellation diagram, simulating a nonlinear function relationship between a transmitted signal and a received signal by using a trained and learned CVDNN, and performing nonlinear compensation on the constellation diagram to obtain the compensated constellation diagram; and calculating a Q-factor based on the compensated constellation diagram, and evaluating communication performance by the Q-factor. Nonlinear compensation is performed on a transmitted signal by using an OPC+CVDNN method to equalize nonlinear degradation of an optical fiber in a WDM coherent optical communication system.

7 Claims, 8 Drawing Sheets

(52) U.S. Cl.
CPC ..... *H04B 10/6162* (2013.01); *H04L 27/3818*
(2013.01); *H04B 2210/25* (2013.01); *H04B 2210/252* (2013.01)

(58) Field of Classification Search
USPC .................................. 398/158–161, 173–180
See application file for complete search history.

(56) References Cited

U.S. PATENT DOCUMENTS

| | | | |
|---|---|---|---|
| 11,038,599 B1* | 6/2021 | Oveis Gharan .... | H04B 10/6165 |
| 2016/0294480 A1* | 10/2016 | Mertz ................ | H04B 10/6163 |
| 2017/0019178 A1* | 1/2017 | Alic .................... | H04B 10/2543 |
| 2020/0366380 A1* | 11/2020 | Janicek .............. | H04B 10/6162 |

FOREIGN PATENT DOCUMENTS

| | | | | |
|---|---|---|---|---|
| CN | 110190906 A | | 8/2019 | |
| CN | 111010239 A | | 4/2020 | |
| CN | 111355536 A | * | 6/2020 | ......... H04B 10/2543 |
| WO | 2013010768 A1 | | 1/2013 | |

* cited by examiner

| parameter | symbol | numerical value |
|---|---|---|
| effective length | $L_{eff}$ | 99 m |
| nonlinear coefficient | $\gamma$ | 11.3 $W^{-1} \cdot km^{-1}$ |
| loss | $\alpha$ | 8.2 dB/km |
| dispersion slope | $\beta$ | 0.017 $ps/nm^2/km$ |
| zero dispersion wavelength | $\lambda_0$ | 1545 nm |
| SBS threshold X effective length | $SL$ | 18 W·m |

METHOD FOR NONLINEAR COMPENSATION OF COHERENT HIGH-CAPACITY HIGH-ORDER QAM SYSTEM

This application is the National Stage Application of PCT/CN2021/079325, filed on Mar. 5, 2021, which claims priority to Chinese Patent Application No. 202110200958.5, filed on Feb. 23, 2021, which is incorporated by reference for all purposes as if fully set forth herein.

FIELD OF THE INVENTION

The present invention relates to the field of optical communication network technologies, and more particularly to a method for nonlinear compensation of coherent high-capacity high-order quadrature amplitude modulation (QAM) optical communication system.

DESCRIPTION OF THE RELATED ART

Capacity shortage is a huge challenge and is exacerbated by the growing demand for high bandwidth and highly connected real-time data. For methods using multiplexing such as wavelength division multiplexing (WDM), polarization-division multiplexing, and spatial division multiplexing and utilizing advanced modulation formats such as high-order QAM or extending bandwidth into another band such as the O-band, the main challenge of capacity shortage in these methods ultimately comes from the nonlinear Shannon limit.

With the application of digital signal processing (DSP) techniques in digital coherent receivers, many digital nonlinear compensation methods such as digital backpropagation, Volterra series nonlinear equalizers, and machine learning-based soft decision have been proposed to approximate the Shannon limit. The digital backpropagation solves the nonlinear Schrödinger equation for optical fiber transmission by a split-step Fourier method to simulate an optical fiber channel, and can effectively equalize a deterministic nonlinear effect. However, the computational complexity of the digital backpropagation increases as a transmission distance increases and dispersion accumulates. As a result, the digital backpropagation is not suitable for real-time systems, especially WDM systems. In addition, although less complex than the digital backpropagation, a Volterra series nonlinear equalizer mainly equalizes a nonlinear effect within a channel in a single channel system. Further, the machine learning-based soft decision may optimize a decision margin of a constellation diagram of a signal. However, nonlinear equalization performance is limited for signals with severe degradation.

In addition, no matter which digital nonlinear compensation method is used to equalize degraded signals, signal quality can only be vertically improved with the same input signal power. This limits the improvement of the input signal power under a given determination threshold. Therefore, although the bit error rate (BER) performance of a communication system is improved to a certain extent, the input signal power basically remains the same. The method cannot increase the number of input channels and cannot improve the channel capacity.

SUMMARY OF THE INVENTION

For this, a technical problem to be resolved by the present invention is to overcome the problem that a digital nonlinear compensation method in the prior art cannot improve channel capacity.

To resolve the foregoing technical problems, a first aspect of the present invention provides a method for nonlinear compensation of coherent high-capacity high-order QAM system at a receiver, including:

deploying an optical phase conjugation (OPC) on an intermediate link of communication between a transmitter and receiver, receiving an idler generated by performing phase conjugation on a transmitted signal based on the OPC;

performing phase recovery on the idler to obtain a constellation diagram, simulating a nonlinear function relationship between a transmitted signal and a received signal by using a trained and learned complex-valued deep neural network (CVDNN), and performing nonlinear compensation on the constellation diagram;

calculating a Q-factor based on the compensated constellation diagram, and evaluating communication performance by using the Q-factor.

In an embodiment of the present invention, the performing phase conjugation on a transmitted signal based on the OPC to generate idler includes:

filtering out amplified spontaneous emission noise from the transmitted signal after amplification to obtain signal light, and simultaneously attenuating, amplifying, and filtering a pump source to obtain pump light, where polarization of the pump light and polarization of the signal light are separately adjusted by respective polarization controllers; and coupling the signal light and the pump light to enter a highly nonlinear optical fiber (HNLF), and performing four-wave mixing to generate phase-conjugated idler.

In an embodiment of the present invention, a total signal power launched into the HNLF and a pump power are preset before phase conjugation is performed on the transmitted signal to obtain an optimal OPC.

In an embodiment of the present invention, a training and learning process of the CVDNN includes:

representing the constellation diagram using a complex value symbol sequence S(n), selecting a training symbol sequence X(n) from the complex value symbol sequence S(n) as an input value of an input layer of the CVDNN, X(n) being denoted as [x(n+k−1), . . . , x(n−1), x(n), x(n+1), . . . , x(n−k+1)], and simultaneously determining that a memory length of the CVDNN is K=2k−1, where n is an index of an $n^{th}$ symbol, and k refers to K previous symbols and K next symbols adjacent to the $n^{th}$ symbol; and transferring the training symbol sequence X(n) step by step from the input layer to an output layer of the CVDNN, and using an output value of a former layer as an input value of a latter layer for training and learning in a transfer process until the output layer outputs a result after training and learning.

In an embodiment of the present invention, the transferring the training symbol sequence X(n) step by step from the input layer to an output layer of the CVDNN, and using an output value of a former layer as an input value of a latter layer for training and learning in a transfer process until the output layer outputs a result after training and learning includes:

transferring the training symbol sequence X(n) of the input layer of the CVDNN to a first hidden layer in a plurality of links to perform training and learning, and calculating an output value of the first hidden layer from the training symbol sequence X(n) on each link by using a training formula of the first hidden layer, the training formula of the first hidden layer being $$h^1 = F\left(\sum_{i=1}^{K} w_i^1 h_i^1 + b_i^1\right),$$

where $h^1$ represents the output value of the first hidden layer, $w^1$ represents a weight value of the first hidden layer, $b^1$ represents a bias vector of the first hidden layer, an activation function F is a Sigmoid nonlinear function of a complex value, and K is the memory length of the CVDNN;

using the output value $h^1$ of the first hidden layer as an input value of a second hidden layer for training and learning, and calculating an output value of the second hidden layer from the output value $h^1$ of the first hidden layer on each link by using a training formula of the second hidden layer, the training formula of the second hidden layer being $$h^2 = F\left(\sum_{i=1}^{M} w_i^2 h_i^2 + b_i^2\right),$$

where $h^2$ represents the output value of the second hidden layer, $w^2$ represents a weight value of the second hidden layer, $b^2$ represents a bias vector of the second hidden layer, an activation function F is a Sigmoid nonlinear function of a complex value, and M is a quantity of first hidden layers; and using the output value $h^2$ of the second hidden layer as an input value of the output layer for training and learning, and calculating the output value of the output layer from the output value $h^2$ of the second hidden layer on each link by using a training formula of the output layer, the training formula of the output layer is being $$o = \sum_{i=1}^{N} w_i^3 h_i^2 + b_i^3,$$

where $h^3$ represents the output value of the output layer, $w^3$ represents a weight value of the output value, $b^3$ represents a bias vector of the output layer, and N is a quantity of second hidden layers.

In an embodiment of the present invention, the training symbol sequence X(n) covers all constellation points on the constellation diagram.

In an embodiment of the present invention, the weight value and the bias vector of each layer of the CVDNN are iteratively calculated by using a minimum MSE between transition-minimized and predicted output symbols, and a calculation formula is as follows:

$$MSE = \frac{1}{B}\sum_{i=1}^{B}(o(i) - s(i))^2,$$

where B is a modular size of total training samples, o is an output value of the CVDNN, and s is an input value corresponding to an output of the CVDNN.

In an embodiment of the present invention, the calculating the Q-factor based on the compensated constellation diagram includes:

calculating a BER based on the compensated constellation diagram; and calculating the Q-factor using the BER based on the following formula:

$$Q = \sqrt{2} \times erfcinv(2 \times BER), \text{ and}$$

$$Q(dB) = 10 \times \log_{10}(Q^2) = 20 \times \log_{10}(Q),$$

where the BER represents a bit error rate, and erfcinv is an inverse of a complementary error function.

A second aspect of the present invention provides a method for nonlinear compensation of coherent high-capacity high-order QAM optical communication system at a receiver assisted by an OPC, including:

receiving, by an OPC for providing a signal resource to a receiver, a transmitted signal on an intermediate link;

performing phase conjugation on the transmitted signal to generate an idler; and transmitting the idler to the receiver, performing phase recovery on the idler to obtain a constellation diagram, and performing nonlinear compensation on the constellation diagram by using a trained and learned CVDNN, and calculating a Q-factor based on the compensated constellation diagram to evaluate communication performance.

A third aspect of the present invention provides a method for nonlinear compensation of coherent high-capacity high-order QAM optical communication system, the system including an OPC and a receiver, the method including:

performing, by the OPC, the following steps:

receiving, by the OPC for providing a signal resource to the receiver, a transmitted signal on an intermediate link;

performing phase conjugation on the transmitted signal to generate an idler; and transmitting the idler to the receiver, performing phase recovery on the idler to obtain a constellation diagram, and performing nonlinear compensation on the constellation diagram by using a trained and learned CVDNN, and calculating a Q-factor based on the compensated constellation diagram to evaluate communication performance; and performing, by the receiver, the following steps:

deploying the OPC on the intermediate link of communication between a transmitter and the receiver;

receiving the idler generated by performing phase conjugation on the transmitted signal based on the OPC;

performing phase recovery on the idler to obtain the constellation diagram, simulating a nonlinear function relationship between a transmitted signal and a received signal by using the trained and learned CVDNN, and performing nonlinear compensation on the constellation diagram; and calculating the Q-factor based on the compensated constellation diagram, and evaluating communication performance by using the Q-factor.

Compared with the prior art, the foregoing technical solution of the present invention has the following advantages:

In the present invention, nonlinear compensation is performed on transmitted signals by using OPC+CVDNN learning to equalize nonlinear degradation of an optical fiber in a WDM coherent optical communication system, and the power of an inputted signal is greatly improved while signal quality is improved, thereby greatly improving channel capacity. The present invention is applicable to a coherent high-capacity high-order QAM communication system.

BRIEF DESCRIPTION OF THE DRAWINGS

To make the content of the present invention clearer and more comprehensible, the present invention is further described in detail below according to specific embodiments of the present invention and the accompanying draws. Where.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

The present invention first provides the following definitions of English marks that need to appear in the following: WDM: wavelength division multiplexing; QAM: quadrature amplitude modulation; AWG: arbitrary waveform generator; IQ Mod: IQ modem; EDFA: erbium-doped fiber amplifier; OBPF: optical bandpass filter; DSP: digital signal processing; Gbaud: a representation unit of a data communication rate; OPC: optical phase conjugation; VOA: variable optical attenuator; HNLF: highly nonlinear optical fiber; and CVDNN: complex-valued deep neural network.

To better understand a method for nonlinear compensation of coherent high-capacity high-order QAM system disclosed in an embodiment of the present invention, the structure of a coherent high-order QAM optical communication system to which embodiments of the present invention are applicable is described below first.

Figure 1:
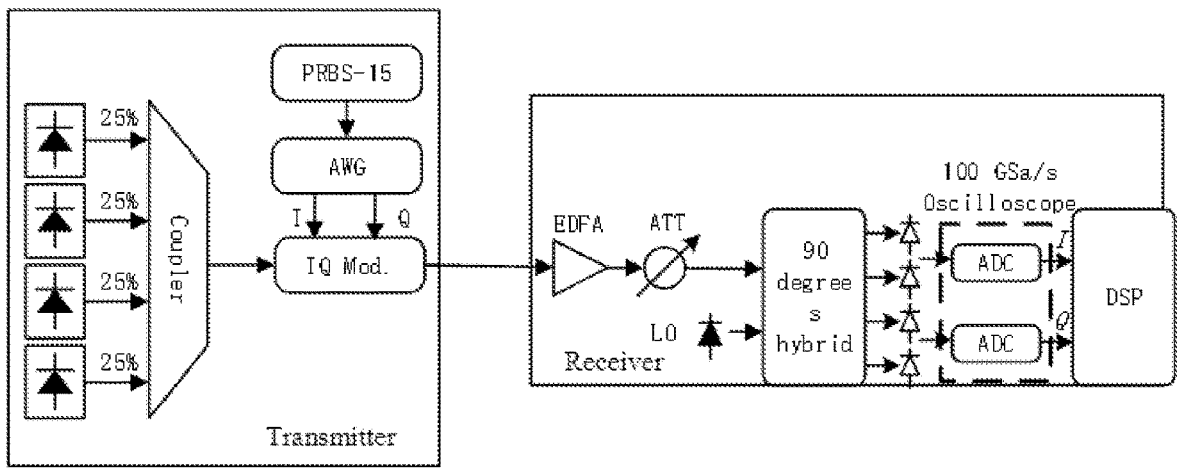
FIG. 1 is a schematic structural diagram of a coherent high-order QAM optical communication system according to an embodiment of the present invention.

FIG. 1 is a schematic structural diagram of a coherent high-order QAM optical communication system according to an embodiment of the present invention. In the structure shown in FIG. 1, the coherent high-order QAM optical communication system includes a transmitter and receiver that perform communication. At the transmitter, four WDM channels have an interval of 50 GHz. The four WDM channels are generated by a light carrier of coupling four external cavity lasers, and have frequencies from 194.3 THz to 194.45 THz, and is modulated by an in-phase/orthogonal IQ modem (IQ Mod). Next, an arbitrary waveform generator (AWG) with a sampling rate of 50 GSamples/s generates two 8-level 12.5 Gbaud electrical signals. A pseudorandom sequence has a length of $2^{15}$-1. A signal outputted after modulation by the transmitter is transmitted to the receiver. At the receiver, the signal is first amplified by an erbium-doped fiber amplifier (EDFA) before entering a coherent light receiver, and then is attenuated by an attenuator to 6.5 dBm. The coherent light receiver is formed by one 100-KHz local oscillator, a 90-degree optical mixer, and four balanced optical detectors. Then a digital storage oscilloscope with a sampling rate of 100 GSamples/s is used to perform analog-to-digital conversion on the signal. Acquired data is processed offline by the DSP, including downsampling, correction for delay and quadrature, removal of inter-symbol interference by a finite impulse response filter, carrier phase recovery, and final calculation of a BER.

Embodiment 1

Figure 2:
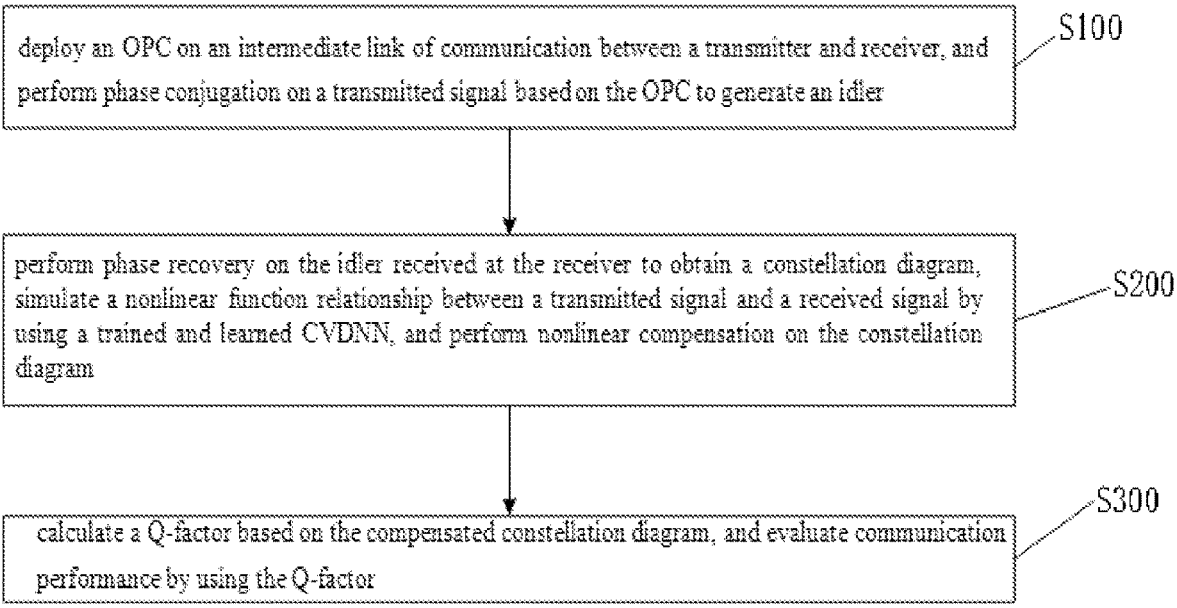
FIG. 2 is a schematic flowchart of a method for nonlinear compensation of coherent high-capacity high-order QAM system according to an embodiment of the present invention.

Based on the coherent high-order QAM optical communication system shown in FIG. 1, an embodiment of the present invention discloses a method for nonlinear compensation of coherent high-capacity high-order QAM system. FIG. 2 is a schematic flowchart of a method for nonlinear compensation of coherent high-capacity high-order QAM system according to an embodiment of the present invention. The method described in FIG. 2 may be applied to the coherent high-order QAM optical communication system shown in FIG. 1.

Referring to FIG. 2, the method for nonlinear compensation of coherent high-capacity high-order QAM system may include the following steps:

Step S100: Deploy an OPC on an intermediate link of communication between a transmitter and receiver, and perform phase conjugation on a transmitted signal based on the OPC to generate an idler.

Figure 3:
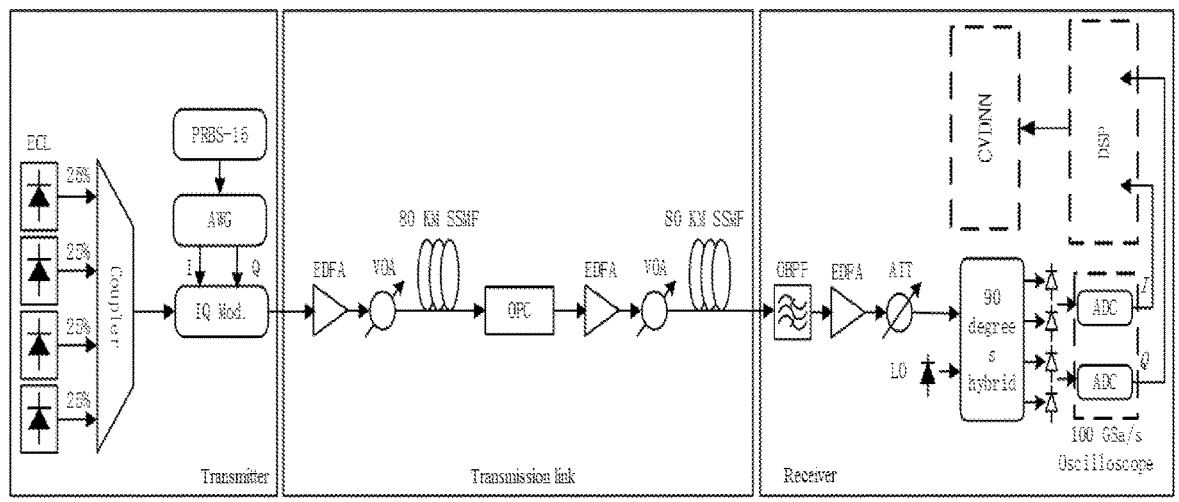
FIG. 3 is a schematic structural diagram of deploying an OPC and a CVDNN on an intermediate link in FIG. 1 according to an embodiment of the present invention.

For example, referring to FIG. 3, in this embodiment, the OPC is deployed on an intermediate link of a high-order QAM coherent optical communication system with amplification by an EDFA. The content of a transmitter and receiver in FIG. 3 has been described in detail in the description content related to the high-order QAM coherent optical communication system shown in FIG. 3. Details are not described herein again in the present invention. In addition, a transmission link between the transmitter and the receiver includes two standard single-mode optical fibers that are 80 kilometers long (with a loss of 0.18 dB/km, and a dispersion of 16.09 ps/nm$^2$), two EDFAs, and two variable optical attenuators (VOAs). The EDFA is configured to compensate for a span loss of the transmission link. The VOA is configured to adjust a power to be transmitted into the standard single-mode optical fibers.

Figure 4:
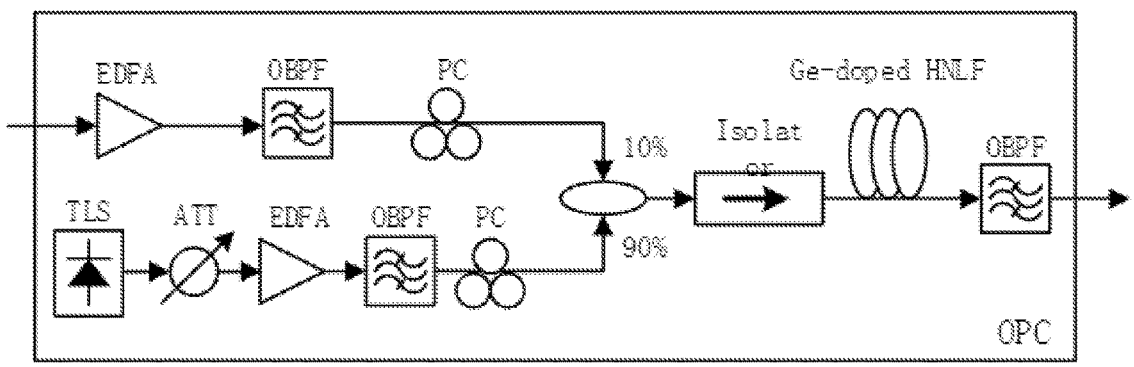
FIG. 4 is a schematic structural diagram of an OPC according to an embodiment of the present invention.
Figures 5, 6:
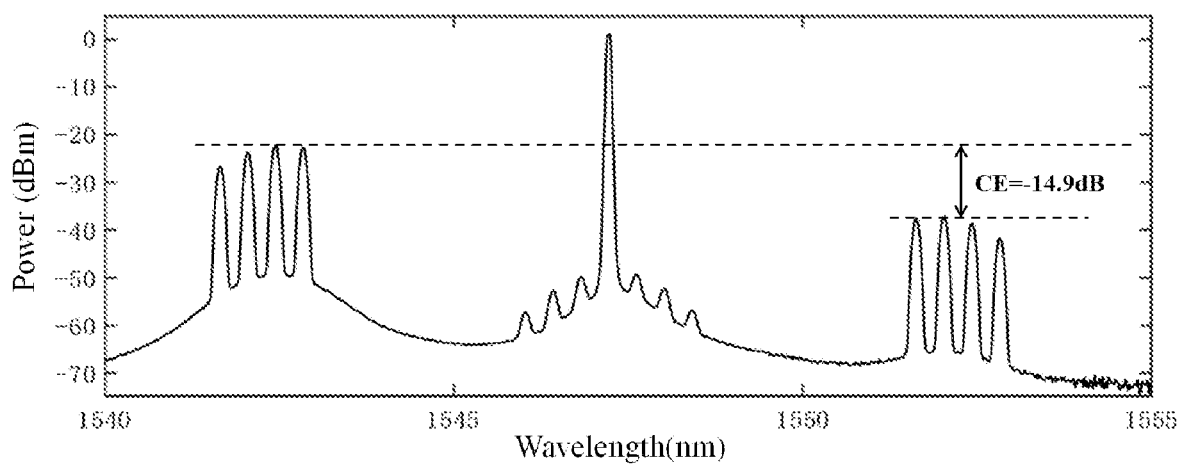
FIG. 5 is a schematic diagram of parameters of a germanium-doped HNLF according to an embodiment of the present invention.
FIG. 6 is an output spectrogram of a germanium-doped HNLF according to an embodiment of the present invention.

For example, referring to FIG. 4, in the OPC, after the transmitted signal is amplified by the EDFA, an optical bandpass filter (OBPF) with a bandwidth of 1 nm and an insertion loss of 3.34 dB filters out amplified spontaneous emission noise of the EDFA to obtain signal light. A tunable laser source simultaneously emits a continuous wave laser with a wavelength of 1547.316 nm as a pump source. The pump source is attenuated by an attenuator and then amplified by the EDFA. An OBPF with a bandwidth of 1 nm and an insertion loss of 1.74 dB performs filtering to obtain pump light. Polarization of the pump light and polarization of the signal light are separately adjusted by respective polarization controllers. Then the pump light and the signal light are coupled by a 90:10 optical coupler (90% pump light and 10% signal light), and an optical isolator is used to isolate reflected waves caused by stimulated Brillouin scattering. Finally, the coupled pump light and signal light are emitted into a germanium-doped HNLF (detailed parameters are shown in FIG. 5) to trigger a four-wave mixing effect, and then an OBPF with a bandwidth of 1.9 nm and an insertion loss of 4 dB performs filtering to obtain the idler.

Figure 7:
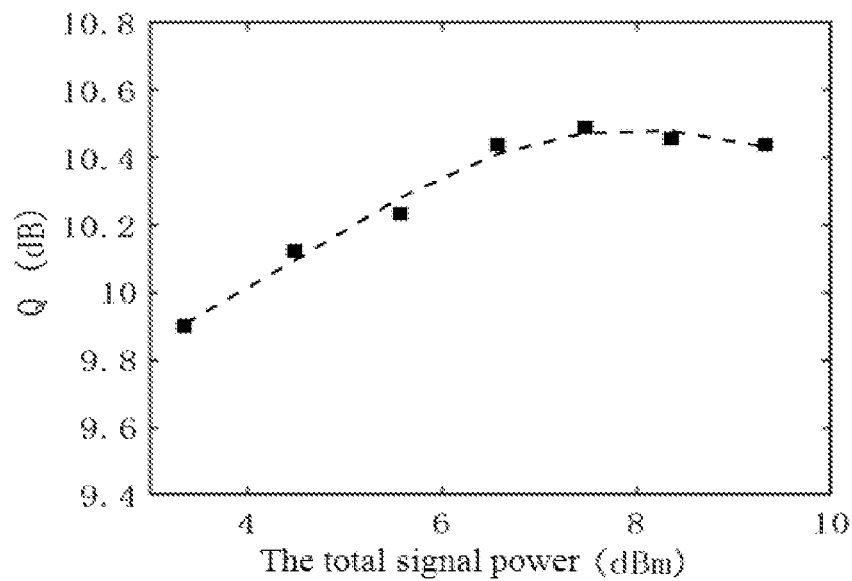
FIG. 7 is a line chart of a total power launched into a germanium-doped HNLF and a Q value according to an embodiment of the present invention.

For example, for the coherent high-order QAM optical communication system, the power of an inputted signal of the HNLF needs to be optimized to obtain high-quality idler. Therefore, in the present invention, a total signal power launched into the HNLF and a pump power are preset before primary nonlinear compensation is performed on the transmitted signal to obtain an optimal OPC. Specifically, a third channel with a wavelength of 1542.54 nm is selected as a to-be-measured channel. According to the schematic diagram of parameters of a germanium-doped HNLF shown in FIG. 5, a maximum input pump power of the HNLF is set to 23.5 dBm, to implement conversion efficiency (CE) that has a maximum of −14.9 dB, as shown in FIG. 6. A total optical power launched into four channels of the HNLF is adjusted to measure corresponding Q values, as shown in FIG. 7. Apparently, when the total power of four WDM channels is greater than 7.5 dBm. Because the channels are nonideal and nonlinear, a Q value of idler of the to-be-measured channel saturates and tends to decrease. Therefore, the pump power and the total signal power that is launched into the HNLF are respectively set to 23.5 dBm and 7.5 dBm to obtain the optimal OPC.

Step S200: Perform phase recovery on the idler received at the receiver to obtain a constellation diagram, simulate a nonlinear function relationship between a transmitted signal and a received signal by using a trained and learned CVDNN, and perform nonlinear compensation on the constellation diagram.

Figure 8:
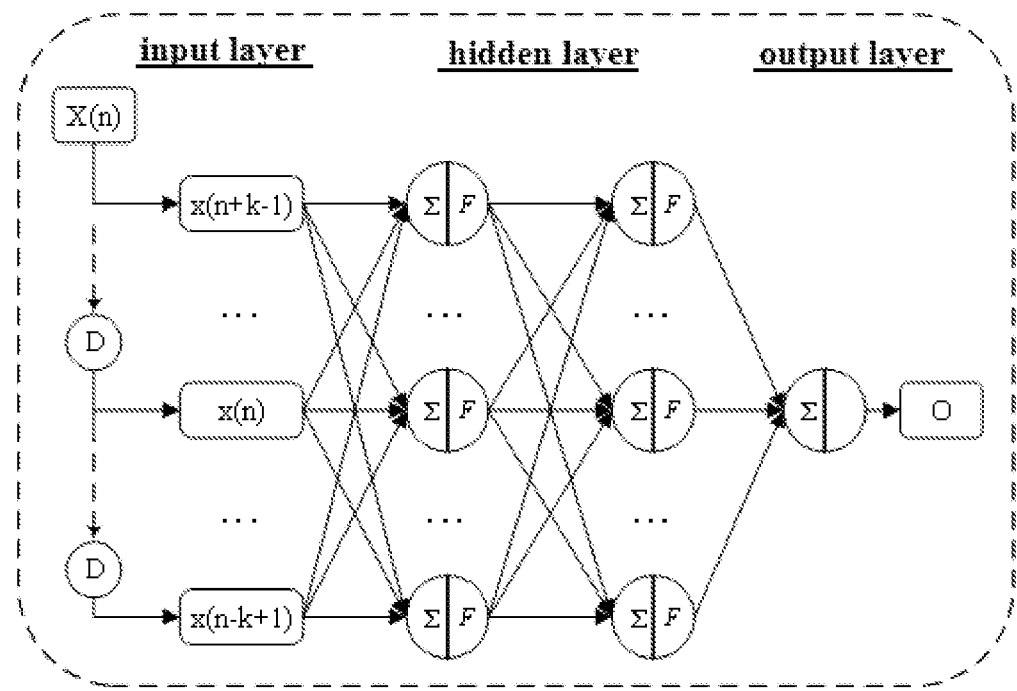
FIG. 8 is a structural block diagram of a CVDNN according to an embodiment of the present invention.
Figure 9:
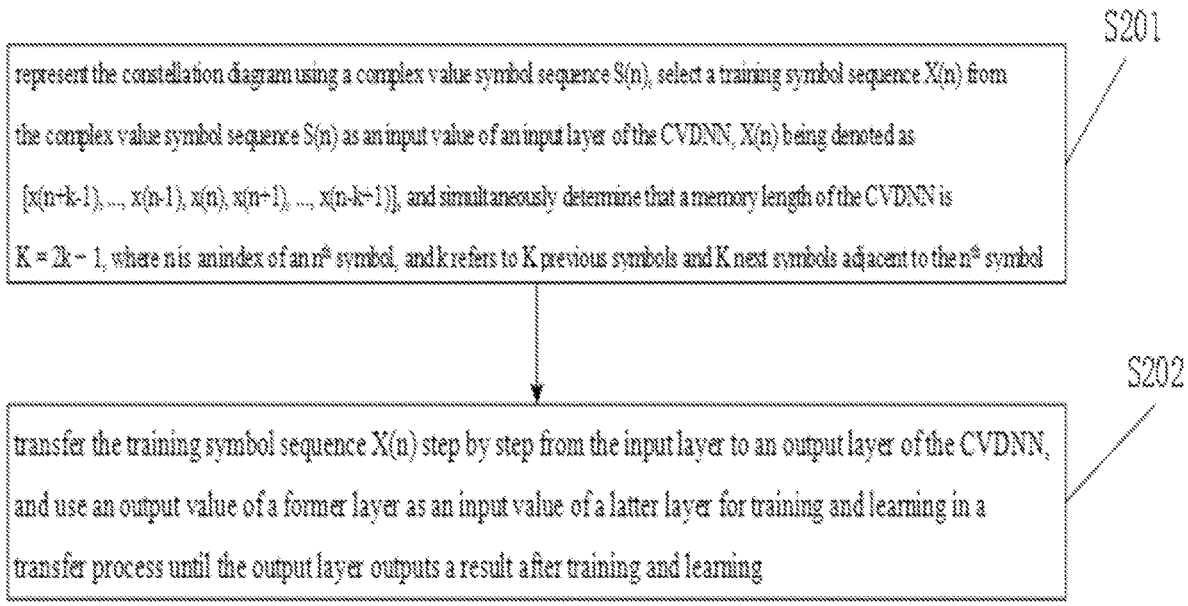
FIG. 9 is a schematic flowchart of step S200 according to an embodiment of the present invention.

For example, FIG. 8 is a structural block diagram of a CVDNN according to the present invention. As can be known from the figure, the CVDNN includes an input layer, a hidden layer, and an output layer. A training and learning process of the CVDNN is described below in detail in conjunction with the content of FIG. 8. Referring to FIG. 9, specific steps are as follows:

Step S201: Represent the constellation diagram using a complex value symbol sequence S(n), select a training symbol sequence X(n) from the complex value symbol sequence S(n) as an input value of an input layer of the CVDNN, X(n) being denoted as [x(n+k−1), . . . , x(n−1), x(n), x(n+1), . . . , x(n−k+1)], and simultaneously determine that a memory length of the CVDNN is K=2k−1, where n is an index of an $n^{th}$ symbol, and k refers to K previous symbols and K next symbols adjacent to the $n^{th}$ symbol.

Step S202: Transfer the training symbol sequence X(n) step by step from the input layer to an output layer of the CVDNN, and use an output value of a former layer as an input value of a latter layer for training and learning in a transfer process until the output layer outputs a result after training and learning.

Figure 10:
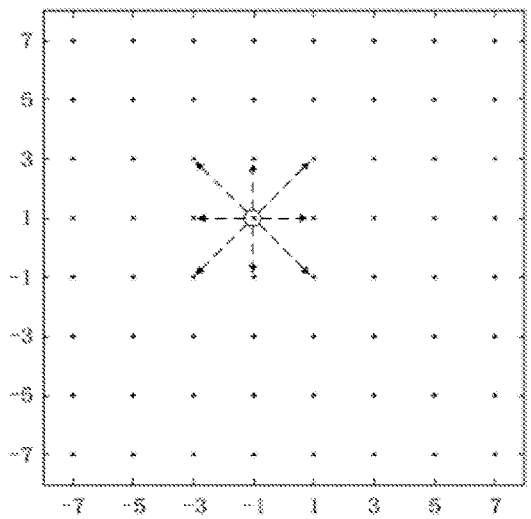
FIG. 10 is a constellation diagram of a 64-QAM signal according to an embodiment of the present invention.
Figure 11:
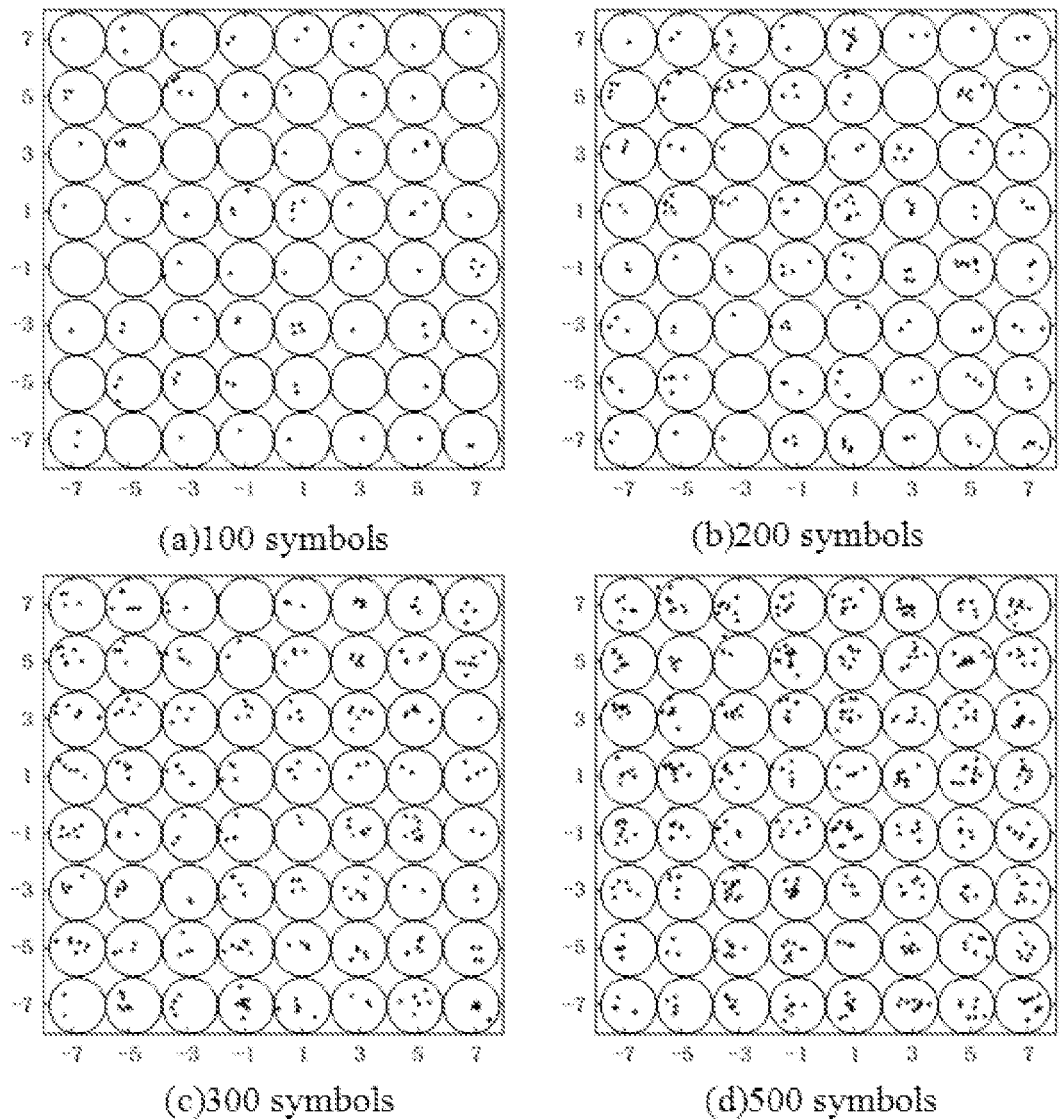
FIG. 11 is a constellation diagram of randomly choosing 100, 200, 300, and 500 symbols from a 64-QAM signal according to an embodiment of the present invention.

For example, in step S201, an increase in the power launched into the HNLF triggers the generation of a nonlinear Kerr effect, and impulses of the transmitted signal are distorted. This is severer in a WDM system. Referring to FIG. 10, nonlinear impulse broadening causes time and phase distortions between one symbol and an adjacent symbol. This is particularly true for a peripheral symbol with a high amplitude using an advanced modulation format. Therefore, when the $n^{th}$ symbol and k−1 previous symbols and k−1 next symbols of the $n^{th}$ symbol are selected as an input, it needs to be considered that there are sufficient symbols for covering 64 constellation points on the constellation diagram, especially constellation points with a high amplitude at a periphery. FIG. 11 shows constellation diagrams of randomly choosing 100, 200, 300, and 500 symbols from a 64-QAM signal. Apparently, when a quantity of symbols is less than 300, there are some missing symbol points in a constellation. When a quantity of input neurons is less than 300, a function relationship between an input and an output cannot be accurately modeled, and as a result network training enters an underfitting state. If the quantity of input neurons is excessively large, although 64 symbols are included, a calculation amount of training increases. Therefore, for the CVDNN in the present invention, it is selected that a quantity of neurons of the input layer of is 325, and it is selected that a quantity of neurons of the hidden layer is 20.

For example, specific content of step S202 includes the following steps: first transferring the training symbol sequence X(n) of the input layer of the CVDNN to a first hidden layer in a plurality of links to perform training and learning, and calculating an output value of the first hidden layer from the training symbol sequence X(n) on each link by using a training formula of the first hidden layer, the training formula of the first hidden layer being $$h^1 = F\left(\sum_{i=1}^{K} w_i^1 h_i^1 + b_i^1\right),$$

where $h^1$ represents the output value of the first hidden layer, $w^1$ represents a weight value of the first hidden layer, $b^1$ represents a bias vector of the first hidden layer, an activation function F is a Sigmoid nonlinear function of a complex value, and K is the memory length of the CVDNN; then using the output value $h^1$ of the first hidden layer as an input value of a second hidden layer for training and learning, and calculating an output value of the second hidden layer from the output value $h^1$ of the first hidden layer on each link by using a training formula of the second hidden layer, the training formula of the second hidden layer being $$h^2 = F\left(\sum_{i=1}^{M} w_i^2 h_i^2 + b_i^2\right),$$

where $h^2$ represents the output value of the second hidden layer, $w^2$ represents a weight value of the second hidden layer, $b^2$ represents a bias vector of the second hidden layer, an activation function F is a Sigmoid nonlinear function of a complex value, and M is a quantity of first hidden layers; and finally using the output value $h^2$ of the second hidden layer as an input value of the output layer for training and learning, and calculating the output value of the output layer from the output value $h^2$ of the second hidden layer on each link by using a training formula of the output layer, the training formula of the output layer being $$o = \sum_{i=1}^{N} w_i^3 h_i^2 + b_i^3,$$

where $h^3$ represents the output value of the output layer, $w^3$ represents a weight value of the output value, $b^3$ represents a bias vector of the output layer, and N is a quantity of second hidden layers.

Figure 12:
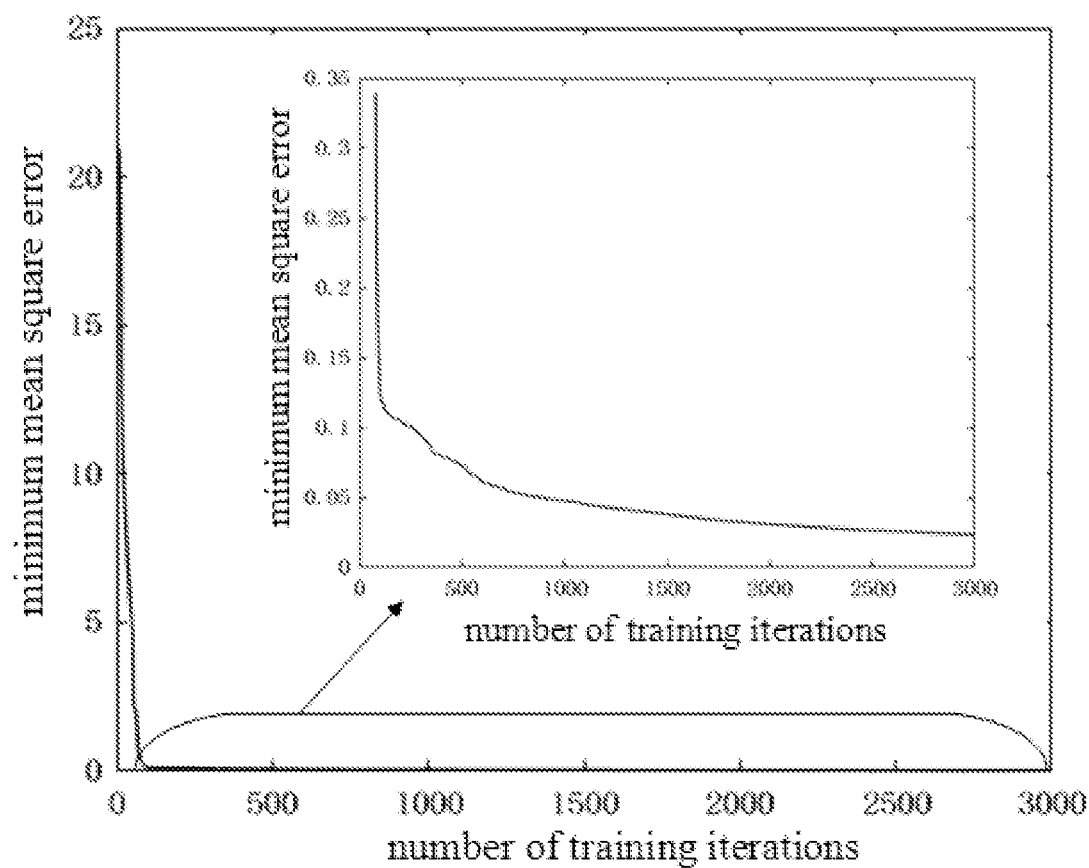
FIG. 12 is a curve chart of a minimum MSE with training iteration times according to an embodiment of the present invention.

For example, the weight value and the bias vector of each layer of the CVDNN are iteratively calculated by using a minimum MSE between transition-minimized and predicted output symbols, and a calculation formula is $$MSE = \frac{1}{B}\sum_{i=1}^{B}(o(i) - s(i))^2,$$

where B is a modular size of total training samples, o is an output value of the CVDNN, and s is an input value corresponding to an output of the CVDNN. FIG. 12 shows a curve of a minimum MSE with training iteration times. As can be seen from FIG. 12, when the number of training iterations reaches around 100, the network starts to converge. However, in this case, the MSE is approximately 0.1. This is insufficient for a 64-QAM signal. To obtain a better training effect, the maximum number of training iterations is set to 3000. In this case, a calculation formula of a multiplication amount of the CVDNN in a training and learning stage is $N_{sum}=4 \times N_t \times N_{ep}(N_{in} \times N_{h1} + N_{h1} \times N_{h2})$, where $N_t$ is a total quantity of training samples, $N_{ep}$ is a quantity of times of training iterations, $N_{in}$ is a quantity of neurons of the input layer, $N_{h1}$ is a quantity of neurons of the first hidden layer, and $N_{h2}$ is a quantity of neurons of the second hidden layer. It may be seen that in a case of a fixed network structure, the multiplication amount of the training and learning stage depends on a quantity of training samples and a quantity of times of training iterations. Therefore, a fast-converging optimization algorithm is crucial to network training and can significantly reduce a training time.

Step S300: Calculate a Q-factor based on the compensated constellation diagram, and evaluate communication performance by using the Q-factor.

For example, a BER is first calculated based on the compensated constellation diagram. A nonlinear function relationship between an input and an output is simulated by applying a CVDNN before the BER is calculated, so that a signal with severe nonlinearity with a high input power is effectively equalized, thereby further improving the accuracy of bit error decision. Then the Q-factor is calculated using the BER based on the following formula:

$Q=\sqrt{2} \times erfcinv(2 \times BER)$, and $Q(dB)=10 \times \log_{10}(Q^2)=20 \times \log_{10}(Q)$, where the BER represents a bit error rate, and erfcinv is an inverse of a complementary error function.

Figure 13:
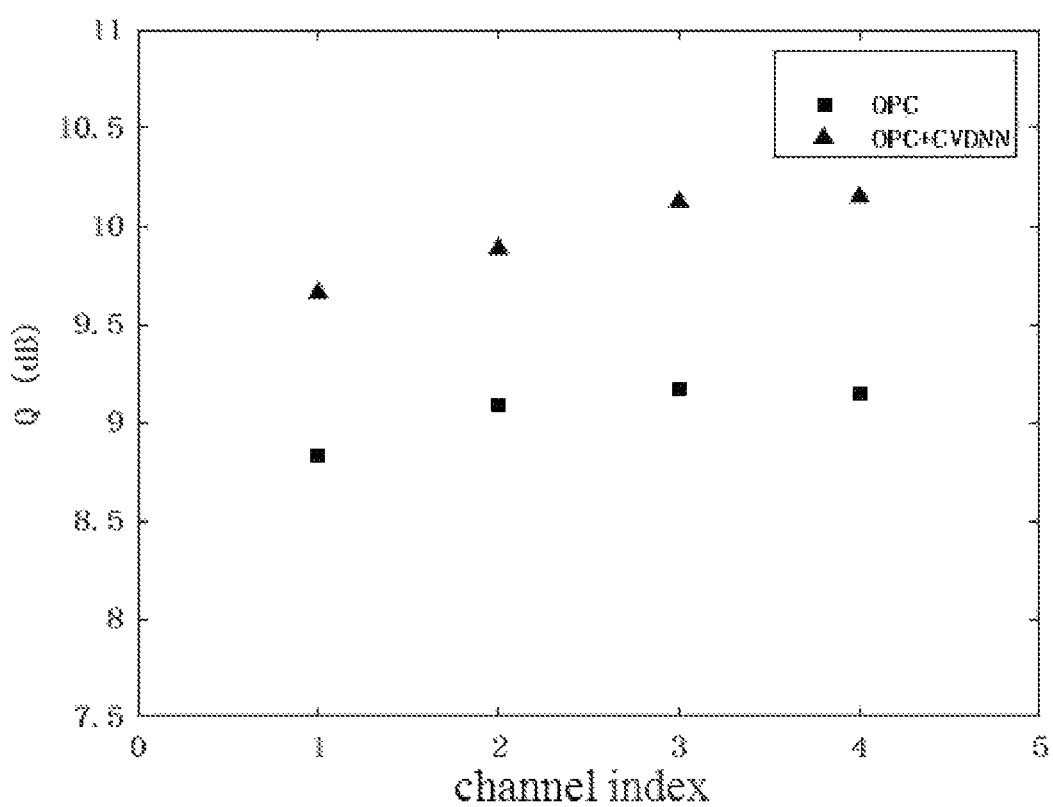
FIG. 13 is a schematic diagram of Q values of four WDM channels measured at an optimal transmit frequency by using an OPC method and an OPC+CVDNN method according to an embodiment of the present invention.

For example, for the OPC, the constellation diagram of a to-be-measured channel still has particular rotation due to internal nonlinearity, and a CVDNN may learn the knowledge of degraded constellation diagrams, to restore a constellation diagram from a rotated state, thereby further equalizing optical fiber nonlinearity in a communication system and improving system performance. FIG. 13 is a schematic diagram of Q values of four WDM channels measured at an optimal transmit frequency by using an OPC method and an OPC+CVDNN method. As can be known from the figure, an average Q value of the four WDM channels measured at an optimal transmit frequency based on the OPC method is approximately 9 dB, whereas an average Q value of the four WDM channels measured at an optimal transmit frequency based on the OPC+CVDNN method is increased to approximately 10 dB, thereby significantly improving communication performance.

In summary, nonlinear compensation is performed on a transmitted signal by using an OPC+CVDNN learning method to equalize nonlinear degradation of an optical fiber in a WDM coherent optical communication system, and the power of an inputted signal is greatly improved while signal quality is improved, thereby greatly improving channel capacity. The present invention is applicable to a coherent high-capacity high-order QAM optical communication system. In one aspect, the introduction of the OPC does not need to strictly require symmetric distribution of a power and dispersion, so that the wavelength contention problem in a transmission link can be mitigated. In another aspect, a CVDNN only uses two hidden layers to simulate a nonlinear function relationship between transmission and reception, the structure is simple and less complex, and in addition is highly robust for an incident optical power and a signal wavelength, so that the complexity of network training can be further reduced.

In the present invention, there are mainly three execution bodies in the method for nonlinear compensation of coherent high-capacity high-order QAM system. The three execution bodies are a transmitter, an OPC, and a receiver. The transmitter performs relatively simple steps, and only serves as a body for transmitting a signal. Therefore, in the present invention, the transmitter being an execution body is not described in detail herein.

Specific content of the receiver, the OPC, and a system formed by the OPC and the receiver being the execution bodies separately is described in the present invention. Specific content of the receiver being the execution body has been described above in details. Details are not described herein again in the present invention.

Embodiment 2

The present invention provides a method for nonlinear compensation of coherent high-capacity high-order QAM system at a receiver assisted by an OPC, including:

receiving, by an OPC for providing a signal resource to a receiver, a transmitted signal on an intermediate link;

performing phase conjugation on the transmitted signal to generate an idler; and transmitting the idler to the receiver, performing phase recovery on the idler to obtain a constellation diagram, and performing nonlinear compensation on the constellation diagram by using a trained and learned CVDNN, and calculating a Q-factor based on the compensated constellation diagram to evaluate communication performance.

The specific content of the method has been described in detail in Embodiment 1. Details are not described herein again in the present invention.

Embodiment 3

The present invention provides a method for nonlinear compensation of coherent high-capacity high-order QAM system. The system includes an OPC and a receiver. The method includes the following steps:

performing, by the OPC, the following steps:

receiving, by the OPC for providing a signal resource to the receiver, a transmitted signal on an intermediate link;

performing phase conjugation on the transmitted signal to generate an idler; and transmitting the idler to the receiver, performing phase recovery on the idler to obtain a constellation diagram, and performing nonlinear compensation on the constellation diagram by using a trained and learned CVDNN, and calculating a Q-factor based on the compensated constellation diagram to evaluate communication performance; and performing, by the receiver, the following steps:

deploying the OPC on the intermediate link of communication between a transmitter and the receiver;

receiving the idler generated by performing phase conjugation on the transmitted signal based on the OPC;

performing phase recovery on the idler to obtain the constellation diagram, simulating a nonlinear function relationship between transmitted signal and a received signal by using the trained and learned CVDNN, and performing nonlinear compensation on the constellation diagram; and calculating the Q-factor based on the compensated constellation diagram, and evaluating communication performance by using the Q-factor.

The specific content of the method has been described in detail in Embodiment 1. Details are not described herein again in the present invention.

A person skilled in the art should understand that the embodiments of the present application may be provided as a method, a system or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a compact disc read-only memory (CD-ROM), an optical memory, and the like) that include computer usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present invention.

What is claimed is:

1. A method for nonlinear compensation of coherent high-capacity high-order quadrature amplitude modulation (QAM) optical communication system at a receiver, comprising steps of:

deploying an optical phase conjugation (OPC) on an intermediate link of communication between a transmitter and the receiver, receiving an idler, which is an idle light, generated by performing phase conjugation on a transmitted signal based on the OPC;

performing phase recovery on the idler to obtain a constellation diagram, simulating a nonlinear function relationship between the transmitted signal and a received signal by using a trained and learned complex-valued deep neural network (CVDNN), and performing nonlinear compensation on the constellation diagram; and calculating a Q-factor based on the compensated constellation diagram, and evaluating communication performance by using the Q-factor, wherein a training and learning process of the CVDNN comprises:

representing the constellation diagram using a complex value symbol sequence S(n), selecting a training symbol sequence X(n) from the complex value symbol sequence S(n) as an input value of an input layer of the CVDNN, X(n) being denoted as [x(n+k−1), . . . , x(n−1), x(n), x(n+1), . . . , x(n−k+1)], and simultaneously determining that a memory length of the CVDNN is K=2k−1, wherein n is an index of an $n^{th}$ symbol, and k refers to K previous symbols and K next symbols adjacent to the $n^{th}$ symbol; and transferring the training symbol sequence X(n) step by step from the input layer to an output layer of the CVDNN, and using an output value of a former layer as an input value of a latter layer for training and learning in a transfer process until the output layer outputs a result after training and learning, wherein the transferring the training symbol sequence X(n) step by step from the input layer to an output layer of the CVDNN, and using an output value of a former layer as an input value of a latter layer for training and learning in a transfer process until the output layer outputs a result after training and learning comprises:

transferring the training symbol sequence X(n) of the input layer of the CVDNN to a first hidden layer in a plurality of links to perform training and learning, and calculating an output value of the first hidden layer from the training symbol sequence X(n) on each link by using a training formula of the first hidden layer, the training formula of the first hidden layer being $$h^1 = F\left(\sum_{i=1}^{K} w_i^1 h_i^1 + b_i^1\right),$$

wherein $h^1$ represents the output value of the first hidden layer, $w^1$ represents a weight value of the first hidden layer, $b^1$ represents a bias vector of the first hidden layer, an activation function F is a Sigmoid nonlinear function of a complex value, and K is the memory length of the CVDNN;
using the output value $h^1$ of the first hidden layer as an input value of a second hidden layer for training and learning, and calculating an output value of the second hidden layer from the output value $h^1$ of the first hidden layer on each link by using a training formula of the second hidden layer, the training formula of the second hidden layer being $$h^2 = F\left(\sum_{i=1}^{M} w_i^2 h_i^2 + b_i^2\right),$$

wherein $h^2$ represents the output value of the second hidden layer, $w^2$ represents a weight value of the second hidden layer, $b^2$ represents a bias vector of the second hidden layer, an activation function F is a Sigmoid nonlinear function of a complex value, and M is a quantity of first hidden layers; and
using the output value $h^2$ of the second hidden layer as an input value of the output layer for training and learning, and calculating the output value of the output layer from the output value $h^2$ of the second hidden layer on each link by using a training formula of the output layer, the training formula of the output layer being $$o = \sum_{i=1}^{N} w_i^3 h_i^2 + b_i^3,$$

wherein $h^3$ represents the output value of the output layer, $w^3$ represents a weight value of the output value, $b^3$ represents a bias vector of the output layer, and N is a quantity of second hidden layers.

2. The method for nonlinear compensation of coherent high-capacity high-order QAM optical communication system at a receiver according to claim 1, wherein performing phase conjugation on a transmitted signal based on the OPC to generate the idler comprises:
filtering out amplified spontaneous emission noise from the transmitted signal after amplification to obtain signal light, and simultaneously attenuating, amplifying, and filtering a pump source to obtain pump light, wherein polarization of the pump light and polarization of the signal light are separately adjusted by respective polarization controllers; and
coupling the signal light and the pump light to enter a highly nonlinear optical fiber (HNLF), and performing four-wave mixing to generate phase-conjugated idler.

3. The method for nonlinear compensation of coherent high-capacity high-order QAM optical communication system at a receiver according to claim 2, wherein a total signal power launched into the HNLF and a pump power are preset before the phase conjugation is performed on the transmitted signal to obtain an optimal OPC.

4. The method for nonlinear compensation of coherent high-capacity high-order QAM optical communication system at a receiver according to claim 1, wherein the training symbol sequence X(n) covers all constellation points on the constellation diagram.

5. The method for nonlinear compensation of coherent high-capacity high-order QAM optical communication system at a receiver according to claim 1, wherein the weight value and the bias vector of each layer of the CVDNN are iteratively calculated by using a minimum MSE between transition-minimized and predicted output symbols, and a calculation formula is as follows:

$$MSE = \frac{1}{B}\sum_{i=1}^{B}(o(i) - s(i))^2,$$

wherein B is a modular size of total training samples, o is an output value of the CVDNN, and s is an input value corresponding to an output of the CVDNN.

6. The method for nonlinear compensation of coherent high-capacity high-order QAM optical communication system at a receiver according to claim 1, wherein the calculating the Q-factor based on the compensated constellation diagram comprises:
calculating a bit error rate (BER) based on the compensated constellation diagram; and
calculating the Q-factor using the BER based on the following formula:

$Q=\sqrt{2}\times\mathrm{erfcinv}(2\times BER)$, and $Q(\mathrm{dB})=10\times\log_{10}(Q^2)=20\times\log_{10}(Q),$ wherein the BER represents a bit error rate, and erfcinv is an inverse of a complementary error function.

7. A method for nonlinear compensation of coherent high-capacity high-order QAM optical communication system, the system comprising an optical phase conjugation (OPC) and a receiver, the method comprising:
performing, by the OPC, steps of:
receiving, by the OPC for providing a signal resource to the receiver, a transmitted signal on an intermediate link;
performing phase conjugation on the transmitted signal to generate an idler, which is an idle light; and
transmitting the idler to the receiver, performing phase recovery on the idler to obtain a constellation diagram, and performing nonlinear compensation on the constellation diagram by using a trained and learned complex-valued deep neural network (CVDNN), and calculating a Q-factor based on the compensated constellation diagram to evaluate communication performance; and
performing, by the receiver, steps of:
deploying the OPC on the intermediate link of communication between a transmitter and the receiver;
receiving the idler generated by performing phase conjugation on the transmitted signal based on the OPC;
performing phase recovery on the idler to obtain the constellation diagram, simulating a nonlinear function relationship between a transmitted signal and a received signal by using the trained and learned CVDNN, and performing nonlinear compensation on the constellation diagram; and calculating the Q-factor based on the compensated constellation diagram, and evaluating communication performance by using the Q-factor, wherein a training and learning process of the CVDNN comprises:

representing the constellation diagram using a complex value symbol sequence S(n), selecting a training symbol sequence X(n) from the complex value symbol sequence S(n) as an input value of an input layer of the CVDNN, X(n) being denoted as [x(n+k−1), . . . , x(n−1), x(n), x(n+1), . . . , x(n−k+1)], and simultaneously determining that a memory length of the CVDNN is K=2k−1, wherein n is an index of an $n^{th}$ symbol, and k refers to K previous symbols and K next symbols adjacent to the $n^{th}$ symbol; and transferring the training symbol sequence X(n) step by step from the input layer to an output layer of the CVDNN, and using an output value of a former layer as an input value of a latter layer for training and learning in a transfer process until the output layer outputs a result after training and learning, wherein the transferring the training symbol sequence X(n) step by step from the input layer to an output layer of the CVDNN, and using an output value of a former layer as an input value of a latter layer for training and learning in a transfer process until the output layer outputs a result after training and learning comprises:

transferring the training symbol sequence X(n) of the input layer of the CVDNN to a first hidden layer in a plurality of links to perform training and learning, and calculating an output value of the first hidden layer from the training symbol sequence X(n) on each link by using a training formula of the first hidden layer, the training formula of the first hidden layer being $$h^1 = F\left(\sum_{i=1}^{K} w_i^1 h_i^1 + b_i^1\right),$$

wherein $h^1$ represents the output value of the first hidden layer, $w^1$ represents a weight value of the first hidden layer, $b^1$ represents a bias vector of the first hidden layer, an activation function F is a Sigmoid nonlinear function of a complex value, and K is the memory length of the CVDNN;

using the output value $h^1$ of the first hidden layer as an input value of a second hidden layer for training and learning, and calculating an output value of the second hidden layer from the output value $h^1$ of the first hidden layer on each link by using a training formula of the second hidden layer, the training formula of the second hidden layer being $$h^2 = F\left(\sum_{i=1}^{M} w_i^2 h_i^2 + b_i^2\right),$$

wherein $h^2$ represents the output value of the second hidden layer, $w^2$ represents a weight value of the second hidden layer, $b^2$ represents a bias vector of the second hidden layer, an activation function F is a Sigmoid nonlinear function of a complex value, and M is a quantity of first hidden layers; and using the output value $h^2$ of the second hidden layer as an input value of the output layer for training and learning, and calculating the output value of the output layer from the output value $h^2$ of the second hidden layer on each link by using a training formula of the output layer, the training formula of the output layer being $$o = \sum_{i=1}^{N} w_i^3 h_i^2 + b_i^3,$$

wherein $h^3$ represents the output value of the output layer, $w^3$ represents a weight value of the output value, $b^3$ represents a bias vector of the output layer, and N is a quantity of second hidden layers.

* * * * *